United States Patent
Demeilliez et al.

(10) Patent No.: US 11,556,445 B2
(45) Date of Patent: Jan. 17, 2023

(54) MECHANISM FOR MONITORING AND ALERTS OF COMPUTER SYSTEMS APPLICATIONS

(71) Applicant: BULL SAS, Les Clayes sous Bois (FR)

(72) Inventors: Bruno Demeilliez, Saint Martin d'Uriage (FR); Christophe Germain, Grenoble (FR); Florent Rochette, Seyssinet Pariset (FR)

(73) Assignee: BULL SAS, les Clayes sous-Bois (FR)

( * ) Notice: Subject to any disclaimer, the term of this patent is extended or adjusted under 35 U.S.C. 154(b) by 578 days.

(21) Appl. No.: 15/850,068

(22) Filed: Dec. 21, 2017

(65) Prior Publication Data

US 2018/0217912 A1   Aug. 2, 2018

(30) Foreign Application Priority Data

Dec. 29, 2016   (FR) ...................................... 1663499

(51) Int. Cl.
*G06F 11/34*     (2006.01)
*H04L 43/0817*   (2022.01)
(Continued)

(52) U.S. Cl.
CPC ...... *G06F 11/3409* (2013.01); *G05B 23/0221* (2013.01); *G05B 23/0283* (2013.01);
(Continued)

(58) Field of Classification Search
CPC ............. G06F 11/3409; G06F 11/3466; H04L 43/0876; H04L 43/0817; H04L 43/16;
(Continued)

(56) References Cited

U.S. PATENT DOCUMENTS

2006/0059568 A1* 3/2006 Smith-Mickelson ... H04L 43/00
                                                                726/27
2007/0050777 A1* 3/2007 Hutchinson ......... G06F 11/0781
                                                                718/104
(Continued)

FOREIGN PATENT DOCUMENTS

EP   2993827   3/2016
EP   2996036   3/2016
(Continued)

OTHER PUBLICATIONS

Emeakaroha, et al., "Low level Metrics to High level SLAs—LoM2HiS framework: Bridging the gap between monitored metrics and SLA parameters in cloud environments," High Performance Computing and Simulation, 2010 International Conference On, IEEE, Piscataway, NJ, Jun. 28, 2010, pp. 48-54.

Wang, et al., "Service Level Management using QoS Monitoring, Diagnostics, and Adaptation for Networked Enterprise Systems," EDOC Enterprise Computing Conference, Ninth IEEE International Enschede, The Netherlands, Piscataway, NJ, EEE, Sep. 19, 2005, pp. 239-250.

(Continued)

*Primary Examiner* — Yoshihisa Ishizuka
(74) *Attorney, Agent, or Firm* — Arc IP Law, PC; Joseph J. Mayo

(57) ABSTRACT

A system including at least one computer and code executable thereby for implementing a mechanism for monitoring performances of applications of an application chain. The system includes an arrangement forming a measuring repository on the one hand for measuring levels of use of resources of applications during periods of degradation of performances of the applications, and by application and by period of the application chain, in a memory storing these levels of use. The arrangement is further operable to: establish a repository of use data by defining and storing in at least (Continued)

Figure 1:
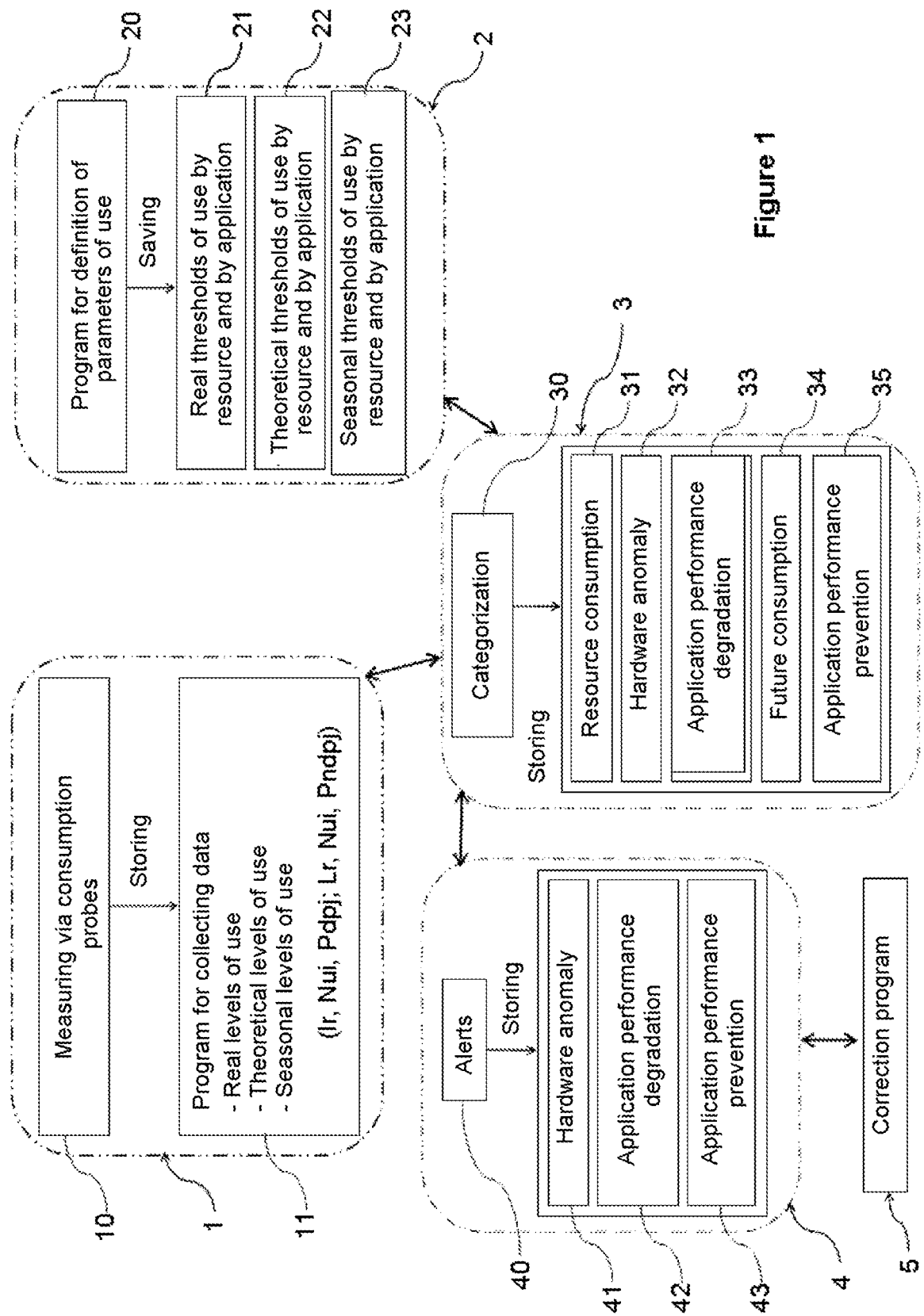

one memory, by resource and by application, thresholds of acceptable performance of the level of use of the measuring repository; constitute a categorization module of performance problems as a function of measuring and use repositories; and implement an alert mechanism when the monitoring mechanism detects a performance problem of the applications or when the problem is resolved.

19 Claims, 2 Drawing Sheets

(51) Int. Cl.
H04L 43/0876 (2022.01)
H04L 43/16 (2022.01)
H04L 41/5009 (2022.01)
H04L 41/5025 (2022.01)
G05B 23/02 (2006.01)

(52) U.S. Cl.
CPC ...... *G06F 11/3466* (2013.01); *H04L 41/5009* (2013.01); *H04L 41/5025* (2013.01); *H04L 43/0817* (2013.01); *H04L 43/0876* (2013.01); *H04L 43/16* (2013.01)

(58) Field of Classification Search
CPC ............ H04L 41/5009; H04L 41/5025; G05B 23/0283; G05B 23/0221
See application file for complete search history.

(56) References Cited

U.S. PATENT DOCUMENTS

| | | | |
|---|---|---|---|
| 2013/0060933 A1* | 3/2013 | Tung | H04L 41/5009 709/224 |
| 2014/0095945 A1* | 4/2014 | Sankaran | G06F 11/0793 714/51 |
| 2014/0149784 A1* | 5/2014 | Ngo | H04L 41/0836 714/4.11 |
| 2014/0236415 A1* | 8/2014 | Foiret | B64F 5/60 701/29.1 |
| 2015/0378786 A1* | 12/2015 | Suparna | G06F 9/5011 718/104 |
| 2016/0269239 A1* | 9/2016 | Ashby, Jr. | H04L 41/0823 |
| 2017/0236060 A1* | 8/2017 | Ignatyev | G06N 20/00 706/46 |
| 2018/0129535 A1* | 5/2018 | Carteri | G06F 9/505 |

FOREIGN PATENT DOCUMENTS

| | | |
|---|---|---|
| EP | 3029573 A1 | 6/2016 |
| EP | 3163445 A1 | 5/2017 |

OTHER PUBLICATIONS

European Search Report issued in EP17211002 dated Feb. 16, 2018 (3 pages).
Preliminary Search Report issued in FR1663499 dated Oct. 4, 2017 (2 pages).

* cited by examiner

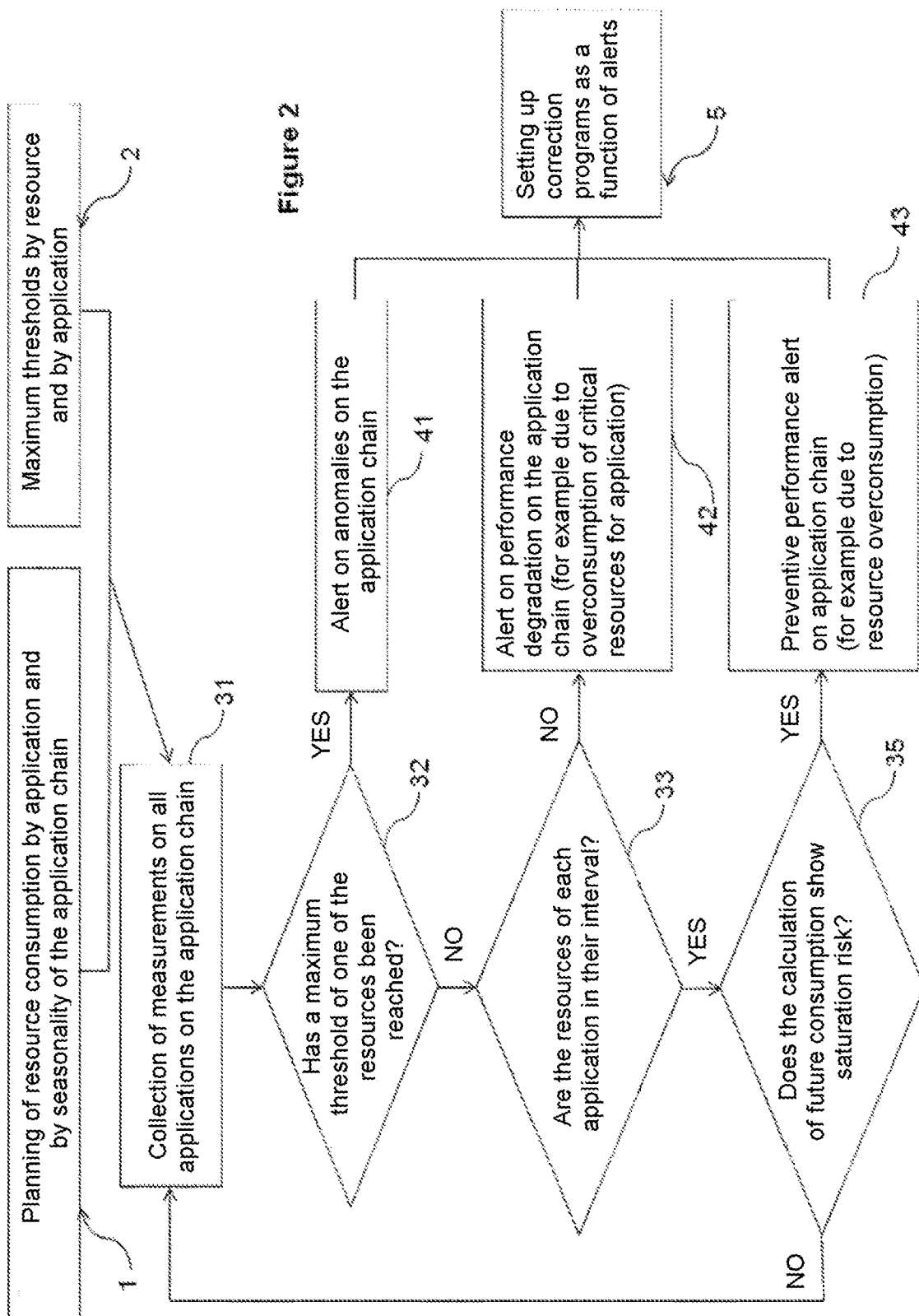

MECHANISM FOR MONITORING AND ALERTS OF COMPUTER SYSTEMS APPLICATIONS

TECHNICAL FIELD OF THE INVENTION

The present invention relates to the field of the monitoring IT infrastructure, and more particularly the field of monitoring and alerts of applications of company computer systems.

TECHNOLOGICAL BACKGROUND OF THE INVENTION

In the scope of the activities of the chief information officers (CIOs), intervention is required when the respect of the quality of service of an application is above critical thresholds or when the application does not work. In general, this situation is explained by the fact that no monitoring is in place on the infrastructure hosting the solution and/or back up in alerts is not done or is done too late. In this case, it is generally very difficult to find the origin of the problem to correct it, as the data necessary for analysis of the problem are not or no longer available.

Solutions for monitoring IT infrastructure are known from the prior art. These solutions diagnose problems of contentions on the servers, but fail to make the link between saturation of resources and applications of the information system. These solutions initiate technical intervention only to resolve the problem, but fail to respond to the levels of "service-level agreements" to be guaranteed by the CIOs (chief information officers) to their business departments to ensure proper performance and proper respect of the quality of service of applications or servers of an application chain.

In this context, it is interesting to propose a solution for eliminating the disadvantages of the prior art by rectifying the problems of application performance of a computer system.

GENERAL DESCRIPTION OF THE INVENTION

The aim of the present invention is to eliminate some disadvantages of the prior art by proposing a solution for rectifying and/or preventing the problems of application performances.

For this purpose, the present invention relates to a system comprising at least one computer machine and a software or code executable by the machine for implementing a mechanism for monitoring performances of applications of an application chain, the system comprising a computer hardware and software arrangement forming a measuring repository (1), on the one hand for measuring by consumption probes installed on resources for measuring levels of use of resources of applications during periods of degradation of performances of one or more applications of the application chain, and on the other hand, by application and by period of the application chain, in a memory (11) storing these levels of use in the measuring repository (1), characterized in that the hardware and software arrangement of the system is further operable to:

establish a repository of use (2) of data of the measuring repository by defining and storing in at least one memory (21, 22, 23), by resource and by application, thresholds (Smin, Sint, Smax) of acceptable performance of the level of use;

constitute a categorization module (3) of performance problems as a function of measuring (1) and use (2) repositories; and implement an alert mechanism (4) when the monitoring mechanism detects a performance problem of one or more applications in the application chain or when the problem is resolved.

Therefore, the invention monitors the resource consumption of applications of an application chain and their evolutions in the alert time before contention occurs or when applications exhibit abnormal behavior, and resolves the problem disclosed hereinabove.

According to another particular feature, the thresholds of acceptable performance of the level of use comprise three acceptable thresholds forming a triplet and consisting of a minimum threshold, a maximum threshold and an intermediate threshold; this triplet of thresholds being stored for each resource and for each application of the application chain.

According to another particular feature, the repository of use comprises at least one hardware and software arrangement for establishing and storing in a memory acceptable consumption intervals defined from measurements of the level of use of the measuring repository.

According to another particular feature, the monitoring mechanism is capable of comparing the level of use of resources, measured and stored in the measuring repository with the thresholds and/or consumption intervals established in the repository of use by application.

According to another particular feature, the repository of use (2) comprises at least one hardware and software arrangement (20) for establishing and storing in a memory the levels of real (21) and theoretical (22) use by threshold (Smin, Sint, Smax) for each resource.

According to another particular feature, the levels of use of resources of applications are measured several times to characterize the different levels of resource consumption of applications.

According to another particular feature, measuring the levels of use of resources of applications is performed in a pre-production or qualification environment.

According to another particular feature, measuring the levels of use of resources of applications is also performed in a production environment to refine, if necessary, the thresholds of acceptable performance of the level of use and/or the consumption intervals for each resource and by application.

According to another particular feature, the measuring repository comprises a hardware and software arrangement for measuring by consumption probes and storing in a memory the "seasonal" levels of use of resources or applications having strong seasonal variations of use, to establish and store "seasonal" thresholds of acceptable performance of the level of use by resource and by application.

According to another particular feature, the categorization module of performance problems establishes the categorization by an operation of:

creation of a "resources consumption" category stored in a memory and comprising the total consumption of a measured level of use for each resource and each application of the application chain, or comparison of a measured level of use of a resource available in the measuring repository with the maximum threshold of acceptable performance of the level of use of each resource of an application available in the repository of use to create a "hardware anomaly"

category, stored in a memory, when the measured level of use is above the maximum threshold of the resource, or comparison of a measured level of use of a resource available in the measuring repository with the acceptable consumption interval of the level of use for each resource of an application available in a memory of the repository of use, to create an "application performance degradation" category stored in a memory, when the measured level of use is outside the acceptable consumption interval of the resource, or calculation of future performance degradation consumption by resource and by application, from the association of a rule of seasonality of needs for resources of an application with the measured level of use of the resource of the application available in the measuring repository, stored in a memory, or comparison of a calculation result of future consumption of a resource with a maximum threshold of acceptable performance of the level of use of each resource of an application available in the repository of use, to create an "application performance prevention" category stored in a memory when the result of the calculation of future consumption of the resource is above the maximum threshold of acceptable performance of the resource of an application, or combination of at least two of the operations hereinabove.

According to another particular feature, the alert mechanism creates and stores in at least one memory at least one or more of the alerts hereinbelow:

a "hardware anomaly" alert when the level of use of a resource of an application available in the measuring repository is above a maximum threshold of acceptable performance of said resource available in the repository of use;

an "application performance degradation" alert when the level of use of a resource of an application available in the measuring repository is outside the acceptable consumption interval of said resource available in the repository of use;

a "preventive application performance" alert when the calculation result of future consumption of a resource of an application available in the memory of the categorization module is above a maximum threshold of acceptable performance of said resource available in the repository of use.

According to another particular feature, the system is capable of continuously monitoring and alerting an anomaly on one or more applications of the application chain, or degradation in performance on the application chain due to overconsumption of critical resources for application or future resource overconsumption.

Another aim is to rectify one or more disadvantages of the prior art concerning the monitoring and alerting mechanism of symptoms observable on applications of an application chain during degradation events of these performances.

This aim is attained by a method for monitoring performances of applications of an application chain and controlling a system according to one of the particular features of the present invention, the method comprising:

a step of measuring and storing the level of use of resources for each application of the application chain to be able to characterize the different levels of resource consumption;

the method further comprises:

a step of measuring and storing the needs for resources of the different components of an application;

a step of constructing a repository of uses from data obtained in the step of measuring and storing the levels of use of resources and needs for resources of applications, to establish a minimum threshold, a maximum threshold and an intermediate threshold for each measured resource and for each application;

a step of categorizing and storing the performance problems of one or more resources from the repository of use and data obtained in the step of measuring and storing the levels of use of resources and needs for resources of applications of the application chain;

a step of comparing the measured levels of use with the thresholds of acceptable performance from performance problems of the categorization step;

a step for setting up an alert of performance problems from data obtained in the comparison step to correct the performance problem(s) by modifying the application chain or the resources of an application of the application chain.

According to another particular feature, the step of comparing the measured levels of use with the thresholds of acceptable performance is reiterated continually to continuously monitor and alert the applications of the application chain.

Other particular features and advantages of the present invention are detailed in the following description.

DESCRIPTION OF THE ILLUSTRATIVE FIGURES

Other particular features and advantages of the present invention will become more clearly apparent upon reading the following description given in reference to the appended drawings, in which:

FIG. 1 schematically illustrates elements of a system for implementing a mechanism for monitoring performances of applications of an application chain according to an embodiment of the invention;

FIG. 2 schematically illustrates a method for monitoring and alerting performances of applications of an application chain according to an embodiment of the invention.

DESCRIPTION OF PREFERRED EMBODIMENTS OF THE INVENTION

In the following, a computer probe is a software associated with equipment (for example a sensor) which, for example once there is a certain variation or cyclically, automatically takes, manages and feedbacks to monitoring equipment measurements intended to inform inter alia of the quality of network flows or of the quality of service (QoS). They therefore need not to send repetitive commands on the part of the user, which only clutter the network, but the feedbacks of information are done automatically by the probes.

In an embodiment, the sampling frequency of the probes must remain constant and synchronous so it can correlate measurements between the different physical and/or virtual servers which make up the application chain.

The present invention relates to a system comprising at least one computer system and a software or code executable by the machine, which communicates with the other hardware or software of an application chain for implementing a mechanism for monitoring performance of applications (or servers) of an application chain, especially during degradation in performance of applications of the application chain. It will be evident that the degradation in application performance of the application chain can be any type of abnormal behavior or any type of potential contention on the one or more of the applications (or servers) of the application chain, for example and non-limiting saturation of resources of an application or resource overconsumption of an application. The application chain comprises a set of resources $(R_1, \ldots, R_i, \ldots, R_n)$ used in all or part by a plurality of applications or servers $(A_1, \ldots, A_j, \ldots A_m)$, the structuration of the application chain is therefore represented in memory by a list of identifiers $Lr_i$ of resources associated with each application $A_j$.

In an embodiment, the system comprises at least one hardware and software arrangement for storing a measuring repository (1). The measuring repository (1) comprises at least one hardware and software computer arrangement (10) for measuring, by consumption probes, a level of use $Nur_i$ of resources $R_i$ on each one of the applications $A_j$ of all the applications $(A_1, \ldots, A_j, \ldots, A_m)$ which constitute the application chain during periods of degradation in performance $Pdp_j$, then storing these levels $Nur_i$ in a memory (11) of the measuring repository (1), in association with the period $Pdp_j$ to constitute information doublets $(Nur_i, Pdp_j)$.

The consumption probes are associated with each resource for feeding back information on measurements or metrics, representing the level of use of resources (Nur). For each resource, the consumption probes define an identifier Lr for the name of the resource and a level of use Nu. The level of use of each resource Nur corresponds to an information doublet $(Lr, Nu_i)$. The same process is carried out for those periods without performance problem for storing triplets $(Lr, Nu_i, Pndp_j)$.

The memory (11) of the measuring repository thus stores triplets $(Lr, Nu_i, Pdp_j)$ or $(Lr, Nu_j, Pdp_j)$, which has the advantage of reducing the number and quantity of information sent by the probes to reduce the bulk of the network and improve precision relative to the known solutions hereinabove.

In some embodiments, the probed resources can be each instance of a cluster, each application cache, each size of files of programming interface messages of JMS/JDBC applications in addition to the processor, inputs/outputs, and memory. The JMS (java messaging service) application programming interface (API) is a programming interface for sending and receiving of messages between applications and, JDBC (java database connectivity) is an API allowing access to databases.

Information can be fedback by the consumption probes, such as for example and non-limiting, the load on each one of the servers calculated as percentage (%) of occupation of resources (processor (also defined as a central processing unit—CPU), a memory, etc.), the load on the inputs/outputs of the discs or the load on the rate of the network (connection packets (also defined as a transmission control protocol—TCP) and counting octets), etc.

Generic elements such as: loads, percentages (%) of occupations of resources, response times, processing time, level of CPU use, level of disc reading, level of disc writing, etc., can be measured by the probes but also more specific elements or events such as the number of files or open ports, JDBC message files (Java DataBase Connectivity, being a programming interface giving a Java program access to databases) or JMS (Java Message Service, being a programming interface for sending and receiving messages between the applications), the rate of occupation of the file system, the operating rate of the garbage collector or memory retriever for J2EE applications (Java Enterprise Edition, J2EE being a server-oriented platform for development and execution of distributed applications), etc.

File system of computer hardware architecture for example means a set of principles and rules according to which files of said computer architecture are organized and handled.

In some embodiments, the system also comprises a hardware and software computer arrangement (20) comprising a configuration repository (2). In fact, the hardware and software arrangement of the system establishes the repository of use in at least one memory (21, 22, 23) defining and storing thresholds (Smin, Sint, Smax) of acceptable performance of the level of use by resource and by application of the application chain.

Measuring the levels of use of resources by probe consumption produce information for the CIOs (chief information officers) on the current and predictive level (by calculations) of the resource consumption of a given application of the application chain. In some embodiments, the levels of use are measured several times, for example and non-limiting three measurements or more, to be able to characterize precisely and reliably the different levels of consumption or use of resources. Repeated measuring of the levels of use of resources on the one hand establishes the thresholds (Smin, Sint, Smax) of acceptable performance, i.e., the threshold(s) from which the performance of the resource of the application will be degraded, and on the other hand establishes acceptable consumption intervals (In) for each resource of an application, i.e., the intervals in which the performance of the resource of the application is not degraded and functions correctly. In some embodiments, the performance thresholds of the level of use comprise three acceptable thresholds forming a triplet consisting of a minimum threshold (Smin), an intermediate threshold (Sint) and a maximum threshold (Smax) for each resource and for each application of the application chain. This triplet of thresholds (Smin, Sint, Smax) is stored in at least one memory (21, 22, 23) of the repository of use (2) for each resource of a given application of the application chain. These different thresholds have the advantage of defining a reliable indicator or information, easy to establish and contributing to appreciation of the state of performance of applications by the CIOs. In some embodiments, the consumption intervals (In) are established from measurements of levels of use of the measuring repository (1), and stored in a memory (24) of the repository of use (2) for each resource and by application of the application chain. This interval can be calculated, for example from measurements of levels of use of the measuring repository (1), which have been taken previously. In fact, these previous measurements establish a seasonality of the use or consumption of the application and consequently of the level of use of resources on each physical or virtual application. The consumption interval can also be calculated from thresholds (Smin, Sint, Smax) of acceptable performance for each resource and by application. In this case in point, the consumption intervals can be between the minimum performance threshold and the intermediate threshold, between the intermediate threshold and the maximum threshold, or between the minimum threshold and the maximum threshold.

In some embodiments, the monitoring mechanism compares the level, use of resources, measured and stored in the measuring repository (1) to the thresholds (Smin, Sint, Smax) and/or the consumption intervals (In) established previously in the repository of use (2) for each resource and for each application. This comparison of measured levels of use with the thresholds and/or the intervals pre-set and stored in the repository of use puts an alert mechanism (4) in place, detailed hereinbelow, when the system detects a potential contention and/or abnormal behavior in one or more applications of the application chain, or when the problem is resolved. Accordingly and contrary to the solutions of the prior art, the system of the present invention has the advantage of making the link between degradation in performance of a resource and applications of the information system which will be impacted by this. According to the embodiments of the present invention, setting up monitoring and alerting applications of the information system therefore corrects and prevents production incidents.

In some embodiments, measuring the levels of use for establishing and storing the thresholds (Smin, Sint, Smax) of acceptable performance and/or the consumption intervals (In) for each resource and by application can be carried out previously in a pre-production computer environment (environment in which the programs of the application are partially executed) or qualification environment (environment in which the programs of the application are tested). This step therefore measures and establishes upstream acceptable performance thresholds and/or consumption intervals (In) for each resource and by application to produce performance thresholds and consumption intervals closest to the computer production phase and ensure optimal detection of degradations in application performance.

In some embodiments, measuring the levels of use for establishing and storing the thresholds (Smin, Sint, Smax) of acceptable performance and/or the consumption intervals (In) for each resource and by application, can also be done in a computer production environment to redefine and refine these different performance thresholds and consumption intervals pre-set and stored in the repository of use. This step monitors the evolution of performance thresholds for each resource of an application of the application chain, remeasures and establishes again to obtain optimal calibration of performance thresholds and consumption intervals for each resource and for each application to be able to implement corrective actions as a function of the evolution of degradation or not of the application performance.

As shown for example in FIG. 1, in some embodiments the repository of use (2) comprises at least one hardware and software arrangement for establishing and storing in at least one memory the levels of real (21) and theoretical (22) use by the different thresholds (Smin, Sint, Smax) for each resource. In this case, a triplet ($Nu_j$, $A_i$, $R_p$) or a doublet ($Nu_j$, $Nur_p$) for the interaction $LrR_pS_i$ will store:

in a memory (21) the list of real levels of use $NumrR_j$ for each threshold (Smin, Sint, Smax) of each resource $R_j$;

in a memory (22), the list of theoretical levels of use $NumtR_q$ for each threshold (Smin, Sint, Smax) of each resource $R_q$.

The theoretical levels of use of each resource are obtained, for example and non-limiting, as a function of abacuses on similar infrastructures (example: network or disc throughput). As to real levels of use of each resource, they are obtained, for example and non-limiting, by analyzing the results of the different probes over the different periods.

In some embodiments, the measuring repository (1) comprises a hardware and software arrangement for measuring by consumption probes and storing in a memory (11) "seasonal" levels of use of resources or applications having strong variations of use, to establish and store "seasonal" thresholds (Smin, Sint, Smax) of acceptable performance of the level of use, in a memory (23) of the repository of use (2) by resource and by application. In this case, a triplet ($Nu_j$, $A_i$, $R_p$) or a doublet ($Nu_j$, $Nur_p$) will be stored for the interaction $LrR_pS_i$:

in a memory (21), the list of real levels of use $NumrR_j$ for each threshold (Smin, Sint, Smax) of each resource $R_j$, in a memory (22), the list of theoretical levels of use $NumtR_q$ for each threshold (Smin, Sint, Smax) of each resource $R_q$;

in a memory (23) the list of real levels of use $NumsR_o$ for each threshold (Smin, Sint, Smax) of each resource $R_o$.

The levels of seasonal use of each resource are obtained, for example and non-limiting, by analyzing the different probes during a complete use cycle for each resource of each application (for example a period of one month, a trimester or a year according to the variability of use of the resource or of the application).

Listing these parameters can make possible comparisons of measured levels of use of resources on the application(s) (or servers) comprising the application chain, with the thresholds (Smin, Sint, Smax) of acceptable performance of the repository of use (2) as a function of the resource, the application and the type of use (real, theoretical and/or seasonal uses). This comparison is made over periods $Pdp_j$ during which performance problems occur with periods $Pndp_j$ without performance problems. The aim is to verify that the resource has reached a level of use or abnormal consumption or close to the maximum level, and set up an alert mechanism on this level of use of the resource of the application to be able to correct abnormal behavior of resources of applications of the application chain. Conducting these comparative analyses of application performances automatically reduces the time of incidents in production.

In some embodiments, the system also comprises a categorization module (3) of performance problems as a function of the measuring (1) and use (2) repositories.

The categorization module (3) of performance problems comprises at least one hardware and software arrangement (30) to constitute a categorization by an operation of:

creation of a "resources consumption" category stored in a memory (31) and comprising the total consumption of a measured level of use for each resource and each application of the application chain, or comparison of a measured level of use of a resource available in the measuring repository with the maximum threshold of acceptable performance of the level of use of each resource of an application available in the repository of use to create a "hardware anomaly" category, stored in a memory, (32) when the measured level of use is above the maximum threshold of the resource, or comparison of a measured level of use of a resource available in the measuring repository in the acceptable consumption interval (In) of the level of use of each resource of an application available in the repository of use to create an "application performance degradation" category stored in a memory (33) when the measured level of use is outside the acceptable consumption interval (In) of the resource, or calculation of "future consumptions" of degradation in performance by resource and by application, from association of a rule of seasonality of needs for resources of an application with the measured level of use of the resource of the application available in the measuring repository, stored in a memory (34), or comparison of a calculation result of future consumption of a resource with a maximum threshold of acceptable performance of the level of use of each resource of an application available in the repository of use to create an "application performance prevention" category stored in a memory (35) when the result of the calculation of future consumption of the resource is above the maximum threshold of acceptable performance of the resource of an application, or combination of at least two of the operations hereinabove.

The creation of a "resources consumption" category in a memory (31) (for example: 10 network or discs) is achieved by using a rule which consists of categorizing or classifying into "resources consumption" any resource $R_j$ whereof the levels of use $Nur_j$ are identified on the different applications ($A_k$, $A_i$, ... ) comprising the application chain, the identifier of said resource $R_1$ being stored in the memory (31) dedicated to "resources consumption". This creation is achieved by means of interactions between the resources of applications available in the memory of the measuring repository (1) so as to create, by resource and by application, a general level of use $NuGr_j$ of said resource $R_j$. The general level of use $NuGr_j$ is obtained by making the total sum $\Sigma NurA_i$ of all the levels $Nur_j$ of a resource used on each application $A_i$ and represents the total measured consumption of the resource $R_j$ on a given application of the application chain.

Creating a "hardware anomaly" category in the memory (32) is done by use of the following rule: when the measured levels of use of resources $Nur_j$ have reached or exceeded the maximum threshold of acceptable performance of real $NumrR_j$ and/or theoretical $NumtR_j$ and/or seasonal $NumsR_j$ levels of use for each resource $R_j$ available in the repository of use (2), the system creates the anomaly, for example following saturation of a resource of an application of the application chain.

Creating an "application performance degradation" category in a memory (33) is done by the use of the following rule: when the measured levels of use of resources $Nur_j$ are outside their consumption interval of levels of use for each resource $R_j$ available in the repository of use (2). This is the case for example during abnormal behavior of a resource of an application of the application chain (such as application out of use or a problem on a cluster instance causing degradation in SLAs, etc.).

Creating a "future consumptions" category in a memory (34) is done from rules known as "seasonality" and the current level of use of resources. It will be evident that the level of use of a resource or of an application can vary over time (for example, one or more moments of the day, week, month or year), causing variations in the level of use of resources over the different applications comprising the application chain. For example, some applications can be in less demand on Wednesdays, which can be explained by the standard week days off for part-timers. Another non-limiting example, financial applications, generally know strong levels of use in a period of monthly or quarterly closure. In this way, all evolutions of the use of an application can be defined by seasonality rules which vary according to the application (especially due to the behavior of users of the application and of business activities) and evolving over time. This explains the need to employ a system for automatically and continuously monitoring and alerting of problems of application performance of an information system.

Creating an "application performance prevention" category in a memory (35) is done by use of the following rule: when results from calculation of future consumption from measured levels of use of resources $Nur_j$ show a risk of saturation of the application. For example and in a non-limiting way, if the seasonality rules for a resource such as a CPU provide that in a period $P_0+60$ m (m defining any duration), the level of use (i.e., future consumption) of the resource will be 3.2 times more than in the given period $P_0$. Because of this, if in a period $P_0$ the measured level of use of the resource of a CPU is 26% of the total size of the CPU. The result of future consumption for this resource, obtained by multiplication of the measured level of use by the forecasting of seasonality rules (according to the rule of seasonality on the date $Dt=P_0+60$ m, the 26% of the level of use is multiplied by 3.2 giving a result of 83.2% of the total size of the CPU), will be important in showing saturation risk and an alert will be set up so as to correct the saturation problem of the CPU (for example, by enhancing the CPU memory).

In some embodiments, the system also comprises a hardware and software computer arrangement (40) for running an alert mechanism (4) when the monitoring mechanism detects a performance problem of one or more applications in the application chain or when the problem is resolved.

The alert mechanism creates and stores in at least one memory (41, 42, 43) at least one or more of the alerts hereinbelow:

a "hardware anomaly" alert when the level of use of a resource of an application available in the measuring repository is above a maximum threshold of acceptable performance of said resource available in the repository of use;

an "application performance degradation" alert when the level of use of a resource of an application available in the measuring repository is outside the acceptable consumption interval (In) of said resource available in the repository of use;

a "preventive application performance" alert when the calculation result of future consumption of a resource of an application available in the memory of the categorization module is above a maximum threshold of acceptable performance of said resource available in the repository of use.

The "hardware anomaly" alert is stored in a memory (41), when a level of use in production is abnormal, to set up corrective action. This corrective action generally modifies the hardware or software configuration of the virtual or physical computer system, such as for example and non-limiting enhancing the memory or the processor, freeing up space on the disc (by adding space or by deleting files, etc.).

The "application performance degradation" alert is stored in a memory (42) when degradation in performance on the application chain is detected to set up adequate corrective action. This corrective action generally monitors the application(s) to determine the origin of the problem, such as for example and non-limiting an application out of service, a problem on a cluster instance causing degradation of the SLAs, etc. This alert set up when the measured level of use of a resource is outside the acceptable consumption interval (In) of this pre-set resource stored in the repository of use of the system. This interval can be set from previous measurements of levels of use for each resource of an application, or from an interval of acceptable consumption of the level of use by resource and by application.

The "preventive application performance" alert is stored in a memory (43) when the aim of the system is to prevent and anticipate a future problem, to set up recommendations of performance evolution for the relevant resource(s). Therefore, in terms of anticipating future resource consumption of applications, a corrective program will be established in a late deadline. This configuration therefore gains time so that an optimal corrective program can be set up which will limit and correct the problems of application performance.

In some embodiments, the system comprises a hardware and software arrangement comprising a correction program (5). In fact, as shown for example in FIGS. 1 and 2, the different types of alerts are analyzed by a processing program for being able to set up the adequate correction program (5) according to the alert detected by the system.

In some embodiments, the system is capable of continuously monitoring and alerting an anomaly on one or more applications of the application chain, or degradation in performance on the application chain due to overconsumption of critical resources for application or future resource overconsumption.

As shown for example in FIG. 2, the monitoring mechanism collects measurements of levels of use for each resource and by application which will be categorized and stored in the memory (31) of the categorization module (3) for identifying the performance problems:

- by comparison with the performance thresholds (Smin, Sint, Smax) established previously for each resource and for each application in particular a resource which will have attained the maximum performance threshold will be categorized and stored in the memory (32) of the categorization module (3) by the system; or
- by comparison with the consumption intervals (In) pre-established for each resource and for each application, in particular a resource which will be out of its acceptable consumption interval will be categorized and stored in the memory (33) of the categorization module (3) by the system; or
- by calculating future consumptions for each resource and for each application, in particular a resource which will have a risk of performance problem will be categorized and stored in the memory (34) of the categorization module (3) by the system.

When the level of use is abnormal, the system sets up improvement measures by way of automatic and continuous alerts. So, as a function of performance problem detected, the system sets up an alert mechanism (4) and an adapted correction program (5). For example, when the categorization module (3) indicates that the measured level of use of a resource has reached its maximum threshold of acceptable performance the alert mechanism establishes a "hardware anomaly" alert in the memory (41) for setting up an adapted correction program on said resource. When the categorization module (3) indicates that the level of use of a resource is outside the interval of acceptable consumption, the alert mechanism establishes an "application performance degradation" alert in the memory (42) for setting up an adapted correction program on said resource. Finally, when the categorization module (3) indicates that the level of use of a resource presents a risk of degradation, for example saturation of resource, the alert mechanism establishes a "preventive application performance" alert in the memory (43) for setting up an adapted correction program on said resource.

The present invention also relates to a method for monitoring performances of applications of an application chain and controlling a system according to one of the embodiments of the present application. The method comprises:

- a step of measuring and storing the level of use of resources for each application of the application chain to be able to characterize the different levels of resource consumption;
- a step of measuring and storing the needs for resources of the different components of an application;
- a step of constructing a repository of use (2) from data obtained in the step of measuring and storing the levels of use of resources and needs for resources of applications, to establish a minimum threshold (Smin), a maximum threshold (Smax) and an intermediate threshold (Sint) for each measured resource and for each application;
- a step of categorizing and storing the performance problems of one or more resources from the repository of use (2) and data obtained in the step of measuring and storing the levels of use of resources and needs for resources of applications of the application chain;
- a step of comparing the measured levels of use with the thresholds of acceptable performance from performance problems of the categorization step;
- a step for setting up an alert of performance problems from data obtained in the comparison step to correct the performance problem(s) by modifying the application chain or the resources of an application of the application chain.

In some embodiments, the step of comparing the measured the levels of use with the acceptable performance thresholds is reiterated continually to monitor and alert continuously the applications of the application chain.

As shown for example in FIG. 2, the measurements of levels of use for each resource by application and by seasonality of the application chain of the measuring repository (1) are categorized and stored in the memory (31) of the categorization module (3). These measurements are compared to either the acceptable performance thresholds or to the pre-set intervals of acceptable consumption which have been preset for each resource and by application to monitor and alert the CIOs of problems of application performance on the application chain. These measurements of levels of use of the measuring repository (1) are compared in three different steps:

- first of all, a first step in which the level measured is compared to the maximum performance threshold (Smax) of the repository of use (2), an abnormal applicative alert (41) will be set up by the system when the level of use has reached its maximum performance threshold;
- next, if the first step shows no anomaly, then in a second step, the level of use is compared to the consumption interval (In) of the repository of use (2), an "application performance degradation" alert (42) will be set up by the system when the level of use is out of its consumption interval;
- then, if the second step shows no degradation in performance, then in a third step, a future consumption calculation is made from the measured level of use, a "preventive application performance" alert (43) will be set up by the system when measuring of the level of use indicates a risk of resource saturation;
- finally, if the third step shows no risk of resource saturation, then a new measurement of the level of use will be taken to automatically and regularly monitor and alert when a performance problem occurs in the application chain.

These different steps of the method are therefore performed continually and automatically to be able to optimize control of computer operations by limiting or without performance problems in the computer system. The method for monitoring application performances of the present invention has the advantage of rapidly and automatically identifying degradations in application performance and setting up a plan for continuous and adapted improvement for each application of the company computer system.

The present application describes various technical characteristics and advantages in reference to the figures and/or various embodiments. The skilled person will understand that the technical characteristics of a given embodiment can actually be combined with characteristics of another embodiment unless explicitly stated otherwise or it is not evident that these characteristics are incompatible, or the combination does not supply a solution to at least one of the technical problems mentioned in the present application. Also, the technical characteristics described in a given embodiment can be isolated from the other characteristics of this mode unless explicitly stated otherwise.

It must be evident for skilled persons that the present invention enables embodiments in many other specific forms without departing from the field of application of the invention as claimed. Consequently, the present embodiments must be considered by way of illustration, but can be modified in the field defined by the scope of the attached claims, and the invention must not be limited to the details given hereinabove.

What is claimed is:

1. A system for monitoring performance of applications of an application chain, said system comprising:
    at least one computer machine comprising at least one memory, a processor, a categorization module and an alert mechanism;
    a non-transitory computer readable medium that stores a software or code executable by the at least one computer machine via said processor, wherein when the software or code is executed by the at least one computer machine, the at least one computer machine is configured to:
        measure, by consumption probes installed on resources, levels of use of resources of one or more of the applications of the application chain;
        store the levels of use of resources in the at least one memory of the at least one computer machine;
        store, in the at least one memory, thresholds of performance of the levels of use;
        constitute one or more categories of one or more performance problems, via said categorization module, of the one or more of the applications of the application chain as a function of the levels of use of resources and the thresholds of performance of the levels of use; and
        create an alert, via said alert mechanism, of a performance problem of the one or more performance problems of the one or more of the applications in the application chain;
        process and analyze said alert to set up a correction program associated with said alert;
        correct the performance problem of the one or more performance problems, via said correction program, by
            modifying the application chain or
            modifying the resources of one or more of the applications of the application chain or
            modifying a hardware configuration of the at least one computer machine,
    wherein the constitute the one or more categories of the one or more performance problems of the one or more of the applications of the application chain comprises:
        comparing the levels of use of a resource available of said resources that is measured with a maximum threshold of performance of the thresholds of performance of the levels of use that is stored of each resource of an application available to create a hardware anomaly category when the levels of use is above the maximum threshold of performance of the levels of use of the resource available,
        comparing the levels of use of the resource available of said resources that is measured with a consumption interval of the levels of use for said each resource of the application available in a memory of the at least one memory, to create an application performance degradation category when the levels of use is outside the consumption interval of the resource available,
        calculating future performance degradation consumption by resource and by application, from an association of a rule of seasonality of needs for said resources of the application with the levels of use of the resource of the application available, stored in the memory of the at least one memory,
        comparing a calculation result of future consumption of a resource of said resources with the maximum threshold of performance of the levels of use of said each resource of the application available, to create an application performance prevention category stored in the memory of the at least one memory when the calculation result of future consumption of the resource is above the maximum threshold of performance of the each resource of the application.

2. The system according to claim 1, wherein the thresholds of performance of the levels of use comprise three thresholds forming a triplet of thresholds and consisting of a minimum threshold, the maximum threshold of performance and an intermediate threshold, and wherein the triplet of thresholds are stored for said each resource and for each application of the application chain.

3. The system according to claim 1, wherein the at least one computer machine is further configured to store consumption intervals defined from measurements of the levels of use.

4. The system according to claim 1, wherein the at least one computer machine is configured to constitute the one or more categories of one or more performance problems by comparing the levels of use of resources, stored in the at least one memory, with the thresholds of performance of the levels of use.

5. The system according to claim 1, wherein the levels of use comprise the levels of real use of each resource and the levels of theoretical use for each resource.

6. The system according to claim 1, wherein said measure the levels of use is performed several times to characterize different levels of resource consumption of applications.

7. The system according to claim 1, wherein, the at least one computer machine is further configured to, in pre-production or in a qualification environment, measure levels of use of resources of the applications and determine the thresholds of performance of the levels of use of resources of the applications in the pre-production or in the qualification environment, wherein said pre-production comprises an environment in which the applications are partially executed.

8. The system according to claim 1, wherein the at least one computer machine is further configured to refine the thresholds of performance of the levels of use based on the levels of use of resources.

9. The system according to claim 1, wherein the at least one computer machine is further configured to measure, by said consumption probes, seasonal levels of use of resources of applications that measure seasonal variations of use and, establish seasonal thresholds of performance by resource and by application.

10. The system according to claim 1, wherein the create the alert of a performance problem of the one or more performance problems of one or more applications in the application chain, comprises, creating at least one or more of:
   hardware anomaly alert when the levels of use of the resource of the application available is above the maximum threshold of performance of said resource available;
   an application performance degradation alert when the levels of use of a resource of an application available is outside a consumption interval of said resource available;
   a preventive application performance alert when future consumption of a resource of the application available in the memory of the categorization module is above the maximum threshold of performance of said resource available.

11. The system according to claim 1, wherein the create the alert of a performance problem of the one or more performance problems of one or more applications in the application chain, comprises alerting an anomaly on one or more applications of the application chain, or degradation in performance on the application chain due to overconsumption of critical resources for application or future resource overconsumption.

12. A method for monitoring performances of applications of an application chain performed by at least one computer machine comprising at least one memory, the method comprising:
   measuring levels of use of resources for each application of the application chain to characterize different levels of resource consumption;
   measuring needs for resources of different components of an application;
   establishing a minimum threshold, a maximum threshold and an intermediate threshold for each resource and for each application based on the levels of use of the resources;
   categorizing performance problems of one or more resources from the levels of use of resources and the needs for resources of applications of the application chain;
   comparing the levels of use with the minimum threshold, the maximum threshold and the intermediate threshold of performance from the performance problems categorized;
   setting up at least one alert of performance problems based on comparing the levels of use with the minimum threshold, the maximum threshold and the intermediate threshold to correct the performance problems;
   processing and analyzing said at least one alert to set up a correction program associated with said at least one alert;
   correcting the performance problems, via said correction program, by
      modifying the application chain or
      modifying the resources of an application of the application chain or
      modifying a hardware configuration of the at least one computer machine,
   wherein the categorizing performance problems of one or more resources from the levels of use of resources and the needs for resources of applications of the application chain comprises:
      comparing the levels of use of a resource available of said resources that is measured with the maximum threshold of performance of the levels of use of each resource of an application available to create a hardware anomaly category when the levels of use is above the maximum threshold of the resource available,
      comparing the levels of use of the resource available of said resources that is measured with a consumption interval of the levels of use for each resource of an application available in a memory of the at least one memory, to create an application performance degradation category when the levels of use is outside the consumption interval of the resource available,
      calculating future performance degradation consumption by resource and by application, from an association of a rule of seasonality of needs for resources of an application with the levels of use of the resource of the application available, stored in the memory of the at least one memory,
      comparing a calculation result of future consumption of a resource with the maximum threshold of performance of the levels of use of each resource of an application available, to create an application performance prevention category stored in the memory of the at least one memory when the calculation result of future consumption of the resource is above the maximum threshold of performance of the resource of an application.

13. The method according to claim 12, wherein comparing the levels of use with the minimum threshold, the maximum threshold and the intermediate threshold of performance is performed to alert the applications of the application chain.

14. A system for monitoring performances of applications of an application chain, said system comprising:
   at least one computer machine;
   a non-transitory computer readable medium that stores a software or code executable by the at least one computer machine, wherein when the software or code is executed by the at least one computer machine, the at least one computer machine is configured to implement:
      consumption probes installed on resources, wherein the consumption probes are configured to measure levels of use of resources of one or more of the applications of the application chain;
      a measuring repository configured to store, in at least one memory of said at least one computer machine, the levels of use of the resources that is measured, and
      thresholds of performance of the levels of use;
      a categorization module configured to categorize, as one or more categories, one or more performance problems of the one or more of the applications of the application chain as a function of the levels of use of resources that is measured and the thresholds of performance of the levels of use in the at least one memory;
      an alert mechanism configured to
         create an alert of a performance problem of the one or more performance problems of the one or more of the applications in the application chain; and a processor configured to
process and analyze said alert to set up a correction program associated with said alert to correct said performance problem,
correct the performance problem of the one or more performance problems, via said correction program, by modifying the application chain or modifying the resources of one or more of the applications of the application chain or modifying a hardware configuration of the at least one computer machine;
wherein said alert mechanism is further configured to set up at least one other alert when said performance problem is corrected,
wherein the categorize, as one or more categories, of one or more performance problems of the one or more of the applications of the application chain comprises:
comparing the levels of use of a resource available of said resources that is measured with a maximum threshold of performance of the levels of use of each resource of an application available to create a hardware anomaly category when the levels of use is above the maximum threshold of the resource available,
comparing the levels of use of the resource available of said resources that is measured with a consumption interval of the levels of use for each resource of an application available in a memory of the at least one memory, to create an application performance degradation category when the levels of use is outside the consumption interval of the resource available,
calculating future performance degradation consumption by resource and by application, from an association of a rule of seasonality of needs for resources of an application with the levels of use of the resource of the application available, stored in the memory of the at least one memory,
comparing a calculation result of future consumption of a resource with the maximum threshold of performance of the levels of use of each resource of an application available, to create an application performance prevention category stored in the memory of the at least one memory when the calculation result of future consumption of the resource is above the maximum threshold of performance of the resource of an application.

15. The system of claim 14, wherein the thresholds of performance of the levels of use comprise a minimum threshold, the maximum threshold and an intermediate threshold for each application of the applications.

16. The system of claim 14, wherein:
the measuring repository is further configured to store the thresholds of performance of the levels of use in the at least one memory; and
the categorization module is further configured to compare the levels of use of resources, stored in the at least one memory, with the thresholds of performance of the levels of use.

17. The system of claim 14, wherein the categorization module is configured to constitute the one or more categories of the one or more performance problems by comparing the levels of use of resources stored in the at least one memory, with the thresholds of performance of the levels of use stored in the at least one memory.

18. The system of claim 14, wherein:
the measuring repository is further configured to store seasonal levels of use of the resources and seasonal thresholds of use in the at least one memory; and
the categorization module is configured to categorize at least one of the one or more performance problems by comparing the seasonal levels of use of the resources with the seasonal thresholds of use in the at least one memory.

19. The system of claim 14, wherein the categorization module is further configured to calculate future use of a resource and compare the future use of the resource with at least one of the thresholds of use.

* * * * *